United States Patent [19]

Wada

[11] Patent Number: 4,470,309

[45] Date of Patent: Sep. 11, 1984

[54] ELECTROMAGNETIC FLOWMETER

[75] Inventor: Ichiro Wada, Yokohama, Japan

[73] Assignee: Tokyo Shibaura Denki Kabushiki Kaisha, Kawasaki, Japan

[21] Appl. No.: 394,304

[22] Filed: Jul. 1, 1982

[30] Foreign Application Priority Data

| Jul. 6, 1981 [JP] | Japan | 56-104430 |
| Aug. 20, 1981 [JP] | Japan | 56-129325 |
| Oct. 7, 1981 [JP] | Japan | 56-148121[U] |
| Oct. 16, 1981 [JP] | Japan | 56-164258 |

[51] Int. Cl.$^3$ ............................................. G01F 1/58
[52] U.S. Cl. ................................................. 73/861.12
[58] Field of Search ........... 73/861.12, 861.14, 861.15, 73/861.16, 861.17

[56] References Cited

U.S. PATENT DOCUMENTS

| 2,848,409 | 8/1958 | Szechman | 73/861.12 X |
| 3,373,608 | 3/1968 | Ketelsen | 73/861.12 |
| 3,566,687 | 3/1971 | Mittelmann | 73/861.16 |
| 3,690,172 | 9/1972 | Ketelsen et al. | 73/861.12 |
| 3,751,980 | 8/1973 | Fryer | 73/861.17 |
| 4,098,118 | 7/1978 | Schmoock | 73/861.12 |

FOREIGN PATENT DOCUMENTS

| 47342 | 3/1982 | European Pat. Off. | 73/861.12 |
| 802017 | 9/1958 | United Kingdom . | |
| 1130368 | 10/1968 | United Kingdom . | |
| 1206463 | 9/1970 | United Kingdom . | |
| 1551007 | 8/1979 | United Kingdom . | |

Primary Examiner—Jerry W. Myracle
Attorney, Agent, or Firm—Cushman, Darby & Cushman

[57] ABSTRACT

An electromagnetic flowmeter has a ferromagnetic main casing and a nonmagnetic flow speed measuring tube passing through the main casing. A pair of electrodes are diametrically disposed in the measuring tube and insulated from it. Magnetic flux generators are disposed in the main casing and arranged perpendicularly to the measuring tube and the central line of the electrodes. Magnetic flux induction elements are formed in the main casing for reducing and extending a magnetic flux density in the measuring tube.

55 Claims, 64 Drawing Figures

FIG. 5
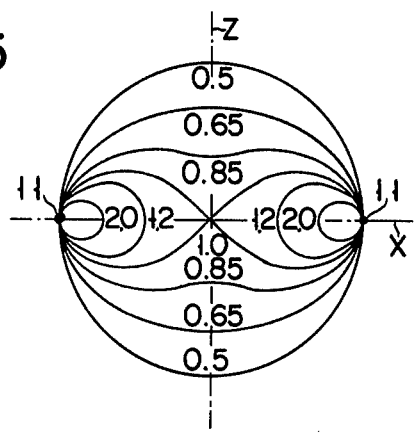
FIG. 6A   FIG. 6B   FIG. 6C
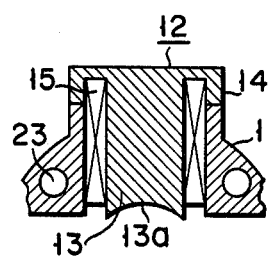   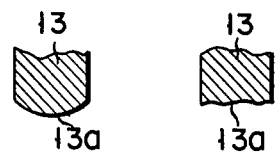
FIG. 6D   FIG. 6E
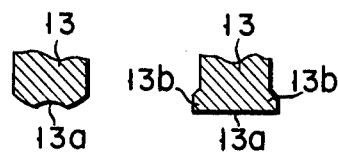
FIG. 7A   FIG. 7B   FIG. 8
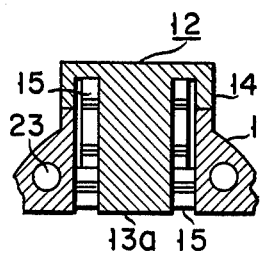   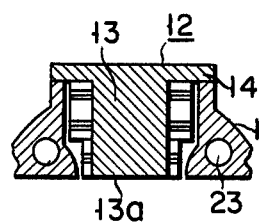   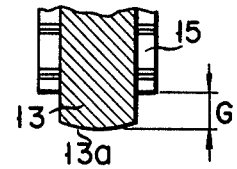

FIG. 22
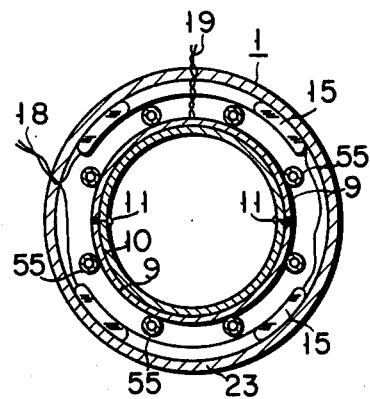
FIG. 23
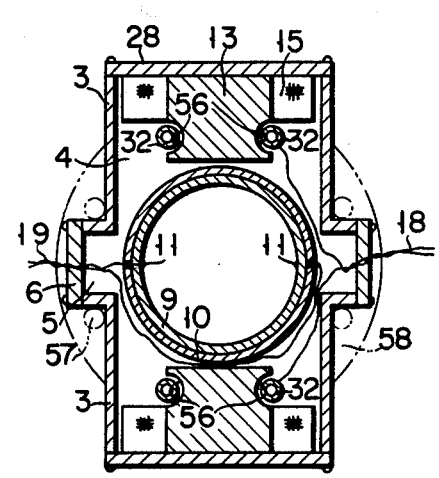
FIG. 24
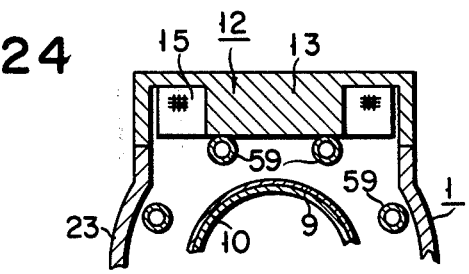
FIG. 25A  FIG. 25B  FIG. 25C
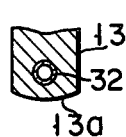 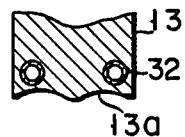 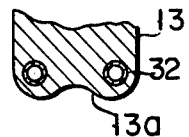
FIG. 25D  FIG. 25E  FIG. 25F
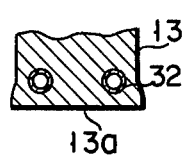 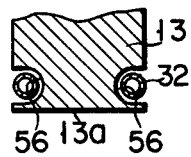 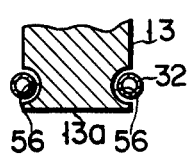

ELECTROMAGNETIC FLOWMETER

BACKGROUND OF THE INVENTION

The present invention relates to an electromagnetic flowmeter and, more particularly, to a compact electromagnetic flowmeter which has a small distance between both end faces thereof and which is easily connected to pipes to measure with high precision a flow speed of a fluid in the pipes.

Generally, electromagnetic flowmeters measure a flow rate of any electrically conductive fluid with high precision. The measuring tubes of electromagnetic flowmeters, through which the liquid flows, have no internal projections, so that pressure loss does not occur, resulting in convenience. However, flowmeters of this type are heavy and cannot be easily connected to pipes.

In order to eliminate the above drawbacks, a flangeless electromagnetic flowmeter is proposed wherein a pair of excitation coils are radially opposed on an axis perpendicular to a longitudinal axis of a cylindrical ferromagnetic ring; a plastic cylinder is concentrically disposed in the ring to form a measuring tube, one end of which has a smalldiameter flange and the other end of which has a flange fitted into the ring; a pair of electrodes are disposed normally to a line which is perpendicular to both the axis of the pair of excitation coils and the axis of the ring; and a filler such as an epoxy resin is filled in a space between the ring and the measuring tube to form an annular pressure chamber.

However, since the two ends of the electromagnetic flowmeter of this type are respectively defined by an end face of the annular pressure chamber and the flange of the plastic measuring tube, both ends of the flowmeter cannot be magnetically sealed. The following drawbacks are thus presented:

(1) The material of the flange at the end of the pipe to which the electromagnetic flowmeter is connected cannot be freely selected. A nonmagnetic insulator (nonmagnetic material, such as a resin and austenitic stainless steel, having a relatively high electrical resistance) can be used. However, a magnetic flange cannot be used.

(2) Since the magnetic poles are fairly separated from the magnetic strip, the magnetic fluxes are not extended. Thus, large excitation coils are required to make the flux distribution ideal.

(3) A distance between the two end faces of the electromagnetic flowmeter must be sufficiently greater than the outer diameter of an iron core of the excitation coil. This is because the end faces of the flowmeter must not be influenced by the magnetic flux.

(4) The material of the bolts for fastening the electromagnetic flowmeter at the flanges of the pipes cannot be freely selected. Although austenitic stainless steel and plastic bolts can be used, magnetic bolts cannot be used.

(5) In a structure which has a ferromagnetic strip as a magnetic path in place of the ferromagnetic ring to interconnect the pair of excitation coils, the magnetic flux leaks around the strip and an error occurs in a flow rate measuring value when the flowmeter is installed near a ferromagnetic structure such as a steel tank or steel piping. Further, the flowmeter tends to be influenced by any external magnetic field. The flowmeter cannot be installed near a power generator or a motor. Thus, the installation location of the flowmeter is limited.

(6) Since the pair of excitation coils are disposed between the bores for fastening bolts, the diameter of the electromagnetic flowmeter is of the order of 100 mm. If the diameter is increased to more than 100 mm, the number of bores must be increased to comply with the standards. As a result, the distance between the bores is small and the excitation coils cannot be disposed in the narrow space.

SUMMARY OF THE INVENTION

An object of this invention is to provide a highly performing electromagnetic flowmeter which is so constructed as to have a magnetic flux distributed substantially ideally unevenly and which has a short distance between the end faces of the flowmeter, leading to a compact and light flowmeter.

Another object of this invention is to provide an electromagnetic flowmeter in which an ideal extended magnetic flux is formed in the measuring tube by magnetic flux induction means.

In order to achieve the above objects of the present invention, there is provided an electromagnetic flowmeter comprising: a ferromagnetic main casing; a nonmagnetic flow speed measuring tube which passes through the ferromagnetic main casing; a pair of electrodes which are exposedly and diametrically disposed in said flow speed measuring tube and which are electrically insulated from said flow speed measuring tube; a magnetic flux generating means which is disposed in said main casing which is perpendicular to said flow speed measuring tube and to a line connecting said pair of electrodes; and magnetic flux induction means which is disposed in said main casing, for reducing and extending a density of magnetic flux generated from said magnetic flux generating means at least in the vicinity of said pair of electrodes.

BRIEF DESCRIPTION OF THE DRAWINGS

This invention can be fully understood from the following detailed description with reference to the accompanying drawings in which:

FIG. 5 is a graph for explaining a weight function of an electromotive force in each position in a flow measuring tube on which the uniform magnetic flux acts;

FIGS. 6A to 6E are cross-sectional views of modifications showing various shapes of inner faces of cores used in the present invention;

FIGS. 7A and 7B and FIG. 8 are cross-sectional views of modifications for explaining how the coils are wound around the core used in the present invention;

FIGS. 21 to 23 are cross-sectional views of electromagnetic flowmeters according to eighth, ninth and tenth embodiments of the present invention, respectively;

FIG. 24 is a cross-sectional view of the main part according to a eleventh embodiment of the present invention;

FIGS. 25A to 25F are longitudinal sectional views of various shapes of inner faces of iron cores used in the present invention, respectively;

DETAILED DESCRIPTION OF THE PREFERRED EMBODIMENTS

Figure 1:
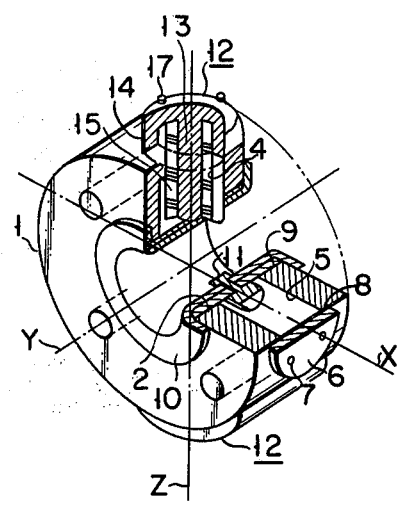
FIG. 1 is a partially broken perspective view of an electromagnetic flowmeter according to a first embodiment of the present invention.

The same reference numerals denote the same or similar parts throughout the drawings, and a detailed description thereof will be omitted from other embodiments and modifications in order to avoid redundancy.

An electromagnetic flowmeter according to a first embodiment of the present invention will be described with reference to FIGS. 1 to 3.

A cylindrical main casing 1 is made of a ferromagnetic material and has a cylindrical bore 2 for a flow measuring tube which is concentrical with a Y-axis of the main casing 1. The main casing 1 further has a Z-axis perpendicular to the Y-axis at the center of the cylindrical bore 2. A pair of bosses 3 extending in opposite directions along the Z-axis of the main casing 1 are disposed on the outer surface of the main casing 1. A hole 4 for mounting a magnetic flux generator such as an excitation coil with a ferromagnetic core is so formed in an area of the main casing 1 as to be concentrical with the bosses 3. A pair of holes 5 for admitting electrodes are formed in the main casing 1 having as their central axis an X-axis which is perpendicular to the Y- and Z-axes and which passes their intersection.

The holes 5 are covered with ferromagnetic covers 6 fixed on the outer surface of the main casing 1 by fastening screws 7 through packings 8.

A flow measuring tube 9 is inserted and fixed in the cylindrical hole 2 of the main casing 1. The measuring tube 9 is made of a nonmagnetic material such as austenitic stainless steel or titanium. A lining 10 of an electrically insulating material is coated on the inner surface of the measuring tube 9. Both ends of the lining 10 are flared.

A pair of rod-shaped electrodes 11 are disposed on the X-axis so as to be perpendicular to the measuring tube 9. Inner ends of the electrodes 11 are exposed in the lining 10, while outer ends thereof extend into the holes 5. The electrodes 11 are electrically insulated from the measuring tube 9.

Each of a pair of magnetic flux generators 12 comprises an iron core 13 and an excitation coil 15 wound around the iron core 13. The outer end portion of the iron core 13 comprises a cap 14 also serving as a ferromagnetic plate. Each generator 12 which is excited in the form of a rectangular wave is inserted into each hole 4 and the cap 14 of the generator 12 is fixed on the upper surface of the boss 3 by the fastening screws 17 with a packing 16 interposed therebetween. An inner end face 13a of the iron core 13 is positioned close to the outer surface of the measuring tube 9. An outer diameter d of the iron core 13 is substantially equal to or slightly smaller than the inner diameter D of the lining 10.

Lead wires 18 connected to an excitation power source (not shown) are led outside the main casing 1 from the coil 15 through a through hole formed on the corresponding covers 6, and lead wires 19 connected to an electromotive force detector (not shown) are led outside the main casing 1 from the electrodes 11 through the through hole formed in the other cover 6.

Four shoulders 20 are defined by holes 4 and 5 in the main casing 1. Edges 21 of the shoulders are disposed closer to the X-axis which is the central axis of the electrodes 11 than to the inner end face 13a of the iron core 13.

Bores 22 for fastening bolts of a ferromagnetic material are formed parallel to the Y-axis in the solid areas of the main casing 1 including the shoulders 20. The flowmeter is mounted by the fastening bolts at the flanges of pipes through which a fluid to be measured flows. The number of bores 22 may be determined by a diameter size of the flowmeter.

Figure 4:
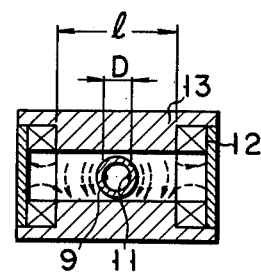
FIG. 4 is a cross-sectional view of a conventional electromagnetic flowmeter.

In the conventional electromagnetic flowmeter, as shown in FIG. 4, a distance D between the electrodes 11 (the inner diameter of the lining 10) is much smaller than a width or diameter l of the iron core 13, whereby the magnetic field in the measuring tube 9 is substantially uniform.

An electromotive force Ex (volts) generated between the electrodes 11 and at any point of a cross section of the measuring tube 9 is given by the following equation:

$$E_X = K \cdot W \cdot B \cdot V \qquad (1)$$

where
- K : the constant;
- W : the weight function;
- B : the magnetic flux density (Wb/m$^2$); and
- V : the flow speed (m/s) of the fluid in the measuring tube 9.

If a weight function W is defined as 1.0 at the center (the intersection between the axes X and Z) of the cross section, the values of the weight function in any points on the cross section may be plotted along the X- and Z-axes, as shown in FIG. 5. For example, W is 0.5 in the vicinity of the generators 12 and W is 2.0 in the vicinity of the electrodes 11. If a flow speed variation of the fluid exists in the measuring tube 9, the electromotive force generated at the electrodes 11 may vary, even though the same variation exists in different locations, and it is thus dependent on the location of the flow speed variation. As a result, an error occurs in the measured values of the flow speed. Assume that the same flow speed variation occurs on the points of the cross section where W=0.20 and W=0.65. Then, the variation of the electromotive force where W=0.20 is three times larger than the electromotive force where W=0.65.

In order to equalize the influence of the weight function for the electromotive force near or at the electrodes 11 against the flow speed variation at any location, the relationship W·B need only equal 1 at any point. The magnetic flux density at any point must have an inverse function of the weight function. In the electromagnetic flowmeter of the first embodiment, the inner diameter D of the lining 10 is equal to or larger than the outer diameter d of the iron core 13, and the shoulders 20 of the ferromagnetic material are formed in the main casing 1. Further, the edges 21 of the shoulders 20 are located closer to the X-axis than to the inner end face 13a of the iron core 13, so that magnetic paths are formed in the shoulders 20. The magnetic flux density in the vicinity of the electrodes 11 is reduced. With the above arrangement, the magnetic flux density on the cross section described above is substantially an inverse function of the weight function.

Assume that magnetic flux densities at W=0.65 and W=2.0 are defined as BV and BH, respectively. The relationship BV : BH=3:1 is ideal, but if n is approximately 3 in the relationship BV : BH=n:1, a larger error does not occur in the measured value of the flow speed of the fluid. In consideration of precision of the flowmeter, n may be selected from a range of 1<n<9.

The magnetic flux density distribution on the cross section of the measuring tube 9 may be determined by the edges 21, localized turns of the coil 15, the position of the coil 15, and the size of the iron core 13. Further, the shape of the inner end face 13a of the iron core 13 is also a factor in determining the distribution.

Referring to FIG. 6A, the inner end face 13a of the iron core 13 is a cylindrical concave surface along the Y-axis. In FIG. 6B, the inner end face 13a is a cylindrical convex surface or a saddle-shaped surface parallel to the Y-axis. Referring to FIG. 6C, the inner end face 13a comprises two cylindrical grooves parallel to the Y-axis. In FIG. 6D, the inner end face 13a is the saddle-shaped surface which has a cylindrical concave surface at its center. Further, in FIG. 6E, the iron core 13 has a flat inner face end 13a and a flanged portion 13b at its side surface.

FIGS. 7A and 7B show means for controlling the magnetic flux density distribution by changing the method of winding the coil 15. Referring to FIG. 7A, the number of turns in the vicinity of the inner end face 13a of the iron core 13 is greater than that of other portions of the iron core 13. However, in FIG. 7B, the arrangement shown in FIG. 7A is reversed.

FIG. 8 shows an example in which the location of the coil 15 around the iron core 13 is arbitrarily selected. In particular, the inner end face 13a of the iron core 13 extends from the inner end of the coil 15 by a distance G, and the end face 13a is a saddle-shaped surface. The distance G may be arbitrarily selected in accordance with the magnetic flux density distribution.

The electromagnetic flowmeters according to the first embodiment and its modifications can obtain the following effects:

(1) Since the magnetic flux density distributions are improved as described above, any error due to the flow speed variation is minimized.

(2) Since rectangular wave excitation is afforded to the magnetic flux generator, a reactive current to the coil is reduced and the impedance of the coil becomes small. Thus, it is unnecessary to use thick electric wires. Moreover, external noises and noises induced by the power source are minimized.

(3) In order to achieve the effect in item (1), the outer diameter d of the iron core of the excitation coil is substantially equal to or smaller than the inner diameter D of the inner portion of the measuring tube on which the lining is coated. Further, since the entire surface of the main casing which is open to the atmosphere is covered with the ferromagnetic material, the magnetic flux does not leak from the end faces of the electromagnetic flowmeter. Therefore, the distance between the end faces thereof can be shortened. As a result, the flowmeter is light in weight and can be easily mounted in the piping.

(4) Since the entire surface of the main casing which is exposed to the atmosphere is made of the ferromagnetic material and since bores for fastening bolts are formed in the main casing of the ferromagnetic material when the flowmeter is installed between the end flanges of the pipes, no magnetic flux leaks. The material of the flanges and the fastening bolts is not limited. Even if the flowmeter is installed near the ferromagnetic structure and the ferromagnetic piping, errors do not occur. Further, since the flowmeter may not be influenced by the external magnetic field, it can be installed close to the power generator or the motor.

(5) The holes for the magnetic flux generators and the electrodes are covered with the cap of the iron core and the ferromagnetic covers, respectively. Therefore, the magnetic flux may not leak and a hermetically sealed structure can be easily obtained.

(6) Since the flanges need not be formed, that is, since a so-called flangeless structure is obtained, the flowmeter can be very easily mounted on or dismounted from the pipes. Especially, in a chemical plant or other plant exhausting slurry, the flowmeters are periodically dismounted and checked. The conventional electromagnetic flowmeter cannot be safely dismounted when several pipelines are located together. However, the electromagnetic flowmeter of the present invention is light in weight and can be detached with ease. Further, the electromagnetic flowmeter according to the present invention also guarantees safe maintenance.

Figure 2:
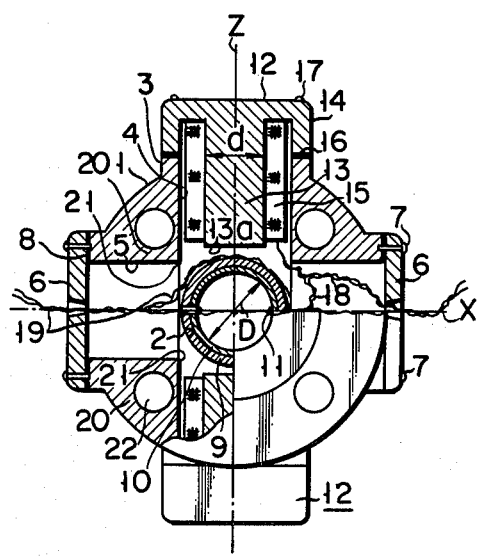
FIG. 2 is a cross-sectional view of the electromagnetic flowmeter in FIG. 1.
Figure 3:
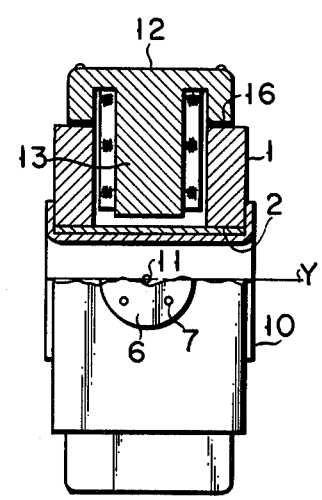
FIG. 3 is a partially broken side view of the electromagnetic flowmeter in FIG. 1.

In the electromagnetic flowmeter of the first embodiment shown in FIGS. 1 to 3, bores 22 for fastening bolts are formed in the main casing 1. However, the present invention is not limited to such bores. For example, tap bores into which are screwed the fastening bolts of the end flanges of the pipes receiving the electromagnetic flowmeter therein may be formed in the main casing 1.

Figures 9A, 9B:
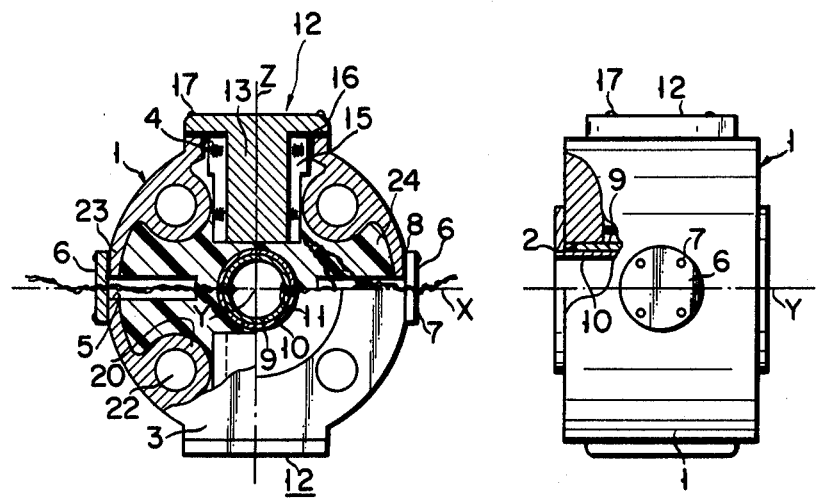
FIG. 9A is a partially broken front view of an electromagnetic flowmeter according to a second embodiment of the present invention.
FIG. 9B is a partially broken side view of the electromagnetic flowmeter in FIG. 9A.

An electromagnetic flowmeter according to a second embodiment of the present invention will be described with reference to FIGS. 9A and 9B. The main casing 1 in this embodiment comprises a cylindrical outer shell 23 which comprises a thin hollow cylindrical body and end plates both made of a ferromagnetic material, and a filler portion 24 made of resin or rubber and molded in the outer shell 23 unlike the solid main casing in the first embodiment. A pair of holes 4 for mounting the excitation coils 12 are formed concentrically with the Z-axis and a pair of holes 5 for holding electrodes are formed concentrically with the X-axis in the outer shell 23, in the same manner as in FIG. 1. The cylindrical bore 2 for the measuring tube extends to both end faces of the outer shell 23 and is concentrical with the Y-axis. Hollow cylindrical shoulders 20 of the ferromagnetic material are located on both sides of each magnetic flux generator 12 in the outer shell 23 and are parallel to the Y-axis of the outer shell 23. The shoulders 20 may be integrally made with the outer shell 23. Alternatively, if the outer shell 23 is made of a sheet plate, pipes of the ferromagnetic material may be disposed as the shoulders 20 along the inner surface of the outer shell 23. The shoulders 20 cause the fastening bolts to extend through bores 22, and receive the fastening bolts in the same manner as in the first embodiment.

For forming the filler portion 24, a core is disposed at a portion of the outer shell 23 which corresponds to the holes 2, 4 and 5, and a filler such as a resin or rubber is molded in the outer shell 23. Generally, the lining 10 is formed on the end faces and inner surface of the measuring tube 9. However, if the filler is of a material such as urethane rubber, silicone rubber or the like, neither measuring tube nor lining is needed. A bore 2 functions as a measuring tube.

The outer diameter d of the iron core 13 is set to be equal to or smaller than the inner diameter of the measuring tube 9, or more accurately, than the inner diameter D of the lining 10. Further, if those portions of the shoulders 20 which are closest to the X-axis are positioned in the same plane wherein the inner end face of the iron core 13 is located, or positioned closer to the X-axis than the inner end face of the iron core 13, the shoulders 20 cause the magnetic flux density in the measuring tube 9 to be substantially inversely proportional to the weight function. Further, if edges corresponding to those in the first embodiment are formed at the shoulders 20, the magnetic flux density may also be changed.

That part of the electromagnetic flowmeter which contacts the atmosphere and that part which surrounds the flange fastening bolts are made of the ferromagnetic material, so that the magnetic flux may not leak to the outside or an external magnetic flux may not be introduced, obtaining the same effects as in the first embodiment. In addition to this, since the main casing 1 is not made of the solid ferromagnetic structure, the electromagnetic flowmeter is light in weight and can be manufactured at low cost.

Other parts of the structure of the electromagnetic flowmeter in the second embodiment are the same as those in the first embodiment. However, the bolt seat structure for the flange fastening bolts is not limited to a structure into which bolts extend. A stud structure may also be utilized wherein tap bores are formed at both ends into which the flange fastening bolts are screwed.

Figure 10:
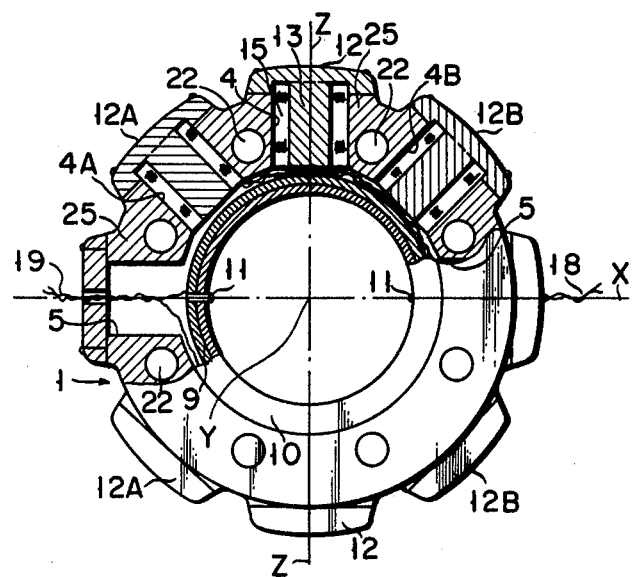
FIG. 10 is a broken front view of an electromagnetic flowmeter according to a third embodiment of the present invention.

In an electromagnetic flowmeter according to a third embodiment in FIG. 10, holes 4A and 4B for mounting excitation coils are formed at both sides of the holes 4 circumferentially of the hollow cylindrical main casing 1 having a thick wall in the first embodiment. Magnetic flux generators 12A and 12B which have substantially the same structure as the magnetic flux generators 12 are held in the holes 4A and 4B. Magnetic fluxes are generated between the excitation coils 12A, between the generators 12, and between the generators 12B. The number of magnetic flux generators in the upper part in FIG. 10 may be different from that of magnetic flux generators in the lower part. Further, if the number of turns of each generator varies, the magnetic flux density distribution within the measuring tube may be changed. The magnetic flux density within the measuring tube may be an inverse function of the weight function.

The cross sections of parts 25 of the main casing 1 between the adjacent generators 12A and 12, between the adjacent generators 12 and 12B, between the adjacent generators 12A and 12B, between the generators 12A and the holes 5, and between the generators 12B and the holes 5 are of a trapezoidal shape. Bores 22 for fastening bolts are formed in the parts 25. Since a number of bolts can be used in the flowmeter of the third embodiment, the flowmeter can be connected to large-diameter pipes. If inner end faces of portions 25 at a distance from the outer surface of the measuring tube 9 which is the same as that between the inner end faces of the generators 12, 12A, 12B and the outer surface of the measuring tube 9, or if the inner end faces of the portions 25 are closer to the outer surface of the measuring tube 9 than the inner end faces of the generators 12, 12A, 12B, the magnetic flux distribution can be controlled in the same manner as in the shoulders 20 of the first and second embodiments.

Figure 11:
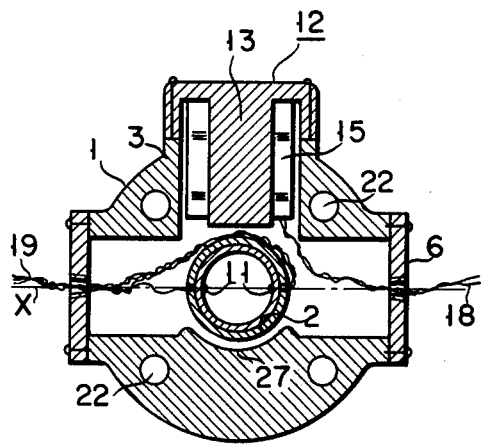
FIG. 11 is a cross-sectional view of electromagnetic flowmeters according to a fourth embodiment of the present invention.

An electromagnetic flowmeter according to a fourth embodiment will be described with reference to FIG. 11. A magnetic flux generator 12 is disposed on one side of the X-axis connecting a pair of electrodes 11, while a yoke 27 for receiving the magnetic flux is disposed on the other side of the X-axis. Thus, a single magnetic flux generator type structure is arranged. The yoke 27 has a concave inner surface which is coaxial with the measuring tube and is integral with the main casing 1. In the system of the single magnetic flux generator arrangement, the magnetic flux of the electromagnetic flowmeter tends to spread on the side of the yoke 27 whereby the yoke is slightly influenced by the flow speed variation of the fluid. However, the flowmeter according to the fourth embodiment can be manufactured at low cost. Therefore, it is very convenient for a low precision flowmeter or for a flow relay.

In the electromagnetic flowmeter of the third embodiment shown in FIG. 10, the generators 12A, 12 and 12B may be replaced with yokes of the fourth embodiment.

Note that the cross-sectional shape of the main casing 1 is not limited to a circular shape throughout the embodiments described above; a square or equilateral polygonal shape may also be utilized. Further, the cross-sectional shape of the core of the excitation coil is not limited to a circular shape; a square or rectangular shape may also be utilized.

Figure 12A:
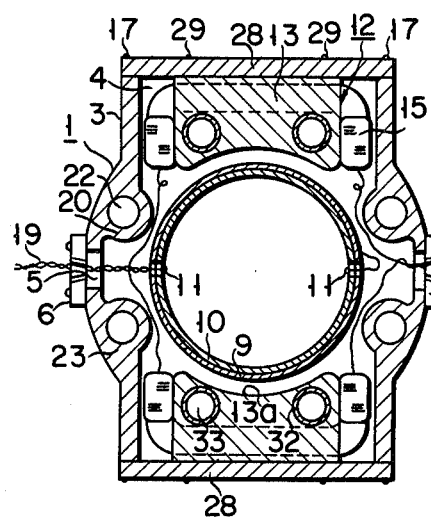
FIGS. 12A and 12B are a cross-sectional view and a partially broken side view of an electromagnetic flowmeter according to a fifth embodiment of the present invention.
Figure 12B:
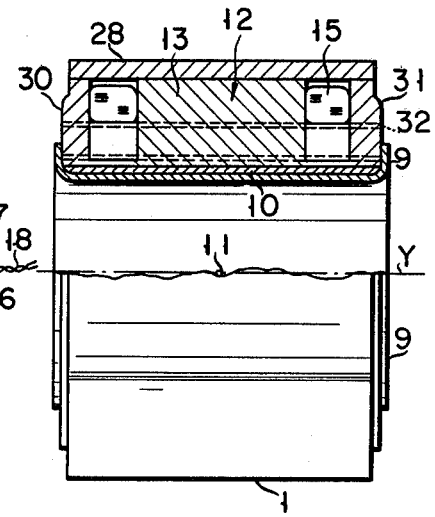

An electromagnetic flowmeter according to a fifth embodiment is shown in FIGS. 12A and 12B. A main casing 1 has a thin-walled outer shell 23. Cylindrical shoulders 20 are formed for controlling the magnetic flux and act as fastening bolt seats in the same manner as in the second embodiment. Upper end faces of iron cores 13 of the generators 12 in holes 4 for mounting the magnetic flux generator are fixed by fastening screws 17 on the inner surfaces of nonmagnetic covers 28 mounted on the outer end faces of the bosses 3. Inner end faces 13a of the iron cores 13 are concentrical with a measuring tube 9 and are adjacent to the outer surface of the measuring tube 9.

Both ends of the main casing 1 are covered with ferromagnetic end plates 30 and 31 (FIG. 12B).

Nonmagnetic pipes 32 extend through the iron cores 13 and the end plates 30 and 31 and are parallel to the Y-axis. Bores defined by the inner surfaces of the pipes 32 receive the fastening bolts. In the fifth embodiment, two bores 33 are formed for each iron core 13. Other parts of the structure of the flowmeter of the fifth embodiment are the same as those of the second embodiment except that the filler is not molded in the inner hollow portion.

Since the main casing 1 and the end plates 30 and 31 are made of the ferromagnetic material in the fifth embodiment, the magnetic flux in the main casing 1 is sealed, and the magnetic flux density distribution in the measuring tube 9 can be changed in the same way as in the previous embodiments. However, since the fastening bolts extending through the iron cores 13 are surrounded by the nonmagnetic pipes 32, the fastening bolts are magnetically sealed from the generators 12. Therefore, even if the fastening bolts extend through the iron cores 13, the magnetic flux of the generators 12 may not leak outside the main casing 1. As a result, the distance between the end faces of the flowmeter can be shortened. Even if the flowmeter is mounted in the vicinity of a ferromagnetic structure, no error occurs in the measured value. Further, since the flowmeter may not be influenced by the external magnetic field, the installation location is not limited.

Further, the main feature of the flowmeter in this embodiment is that the materials for the flanges at the ends of the pipes and for the flange fastening bolts are not limited. Further, the flanges formed on each end of the electromagnetic flowmeter may be eliminated, and the flowmeter may be inserted between the flanges of the pipes. Since the flange fastening bolts extend through the main casing 1, the flowmeter as a whole is light in weight and can be easily mounted and dismounted.

For measuring the flow speed of a high-pressure fluid, the number of the fastening bolts must be increased in accordance with the pressure of the fluid. However, some of the fastening bolts extend through the iron cores 13, so that the number of fastening bolts may be arbitrarily increased. Further, since the flange fastening bolts are magnetically sealed from the main casing 1 by the shoulders 20 and the pipes 32, the hermetically sealed structure of the flowmeter is assured against the high-pressure fluid.

Figure 13:
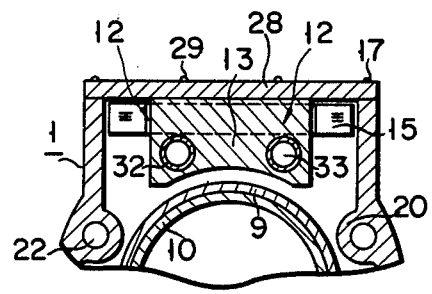
FIGS. 13 to 16 are cross-sectional views of main parts according to modifications of the fifth embodiment, respectively.

FIG. 13 shows an electromagnetic flowmeter according to one modification of the fifth embodiment. The flowmeter in the modification is substantially the same as that in the fifth embodiment except that the coils 15 are wound only around that part of the iron core outside the pipes 32.

Figure 14:
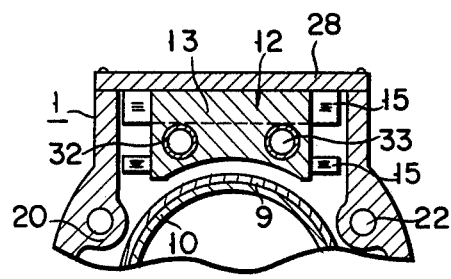

FIG. 14 shows an electromagnetic flowmeter according to another modification of the fifth embodiment. The flowmeter in this modification is substantially the same as that in the fifth embodiment except that the coils 15 are wound around these regions of the iron core 13 in which pipes 32 are not disposed.

Figure 15:
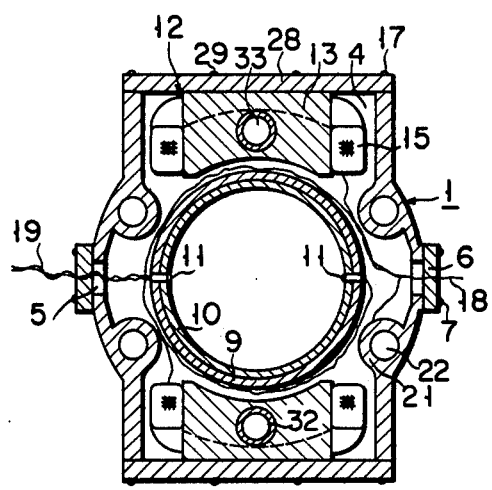

FIG. 15 shows an electromagnetic flowmeter according to a further modification of the fifth embodiment. The flowmeter in this modification is substantially the same as that in the fifth embodiment except that only one pipe 32 passed through each iron core 13.

Figure 16:
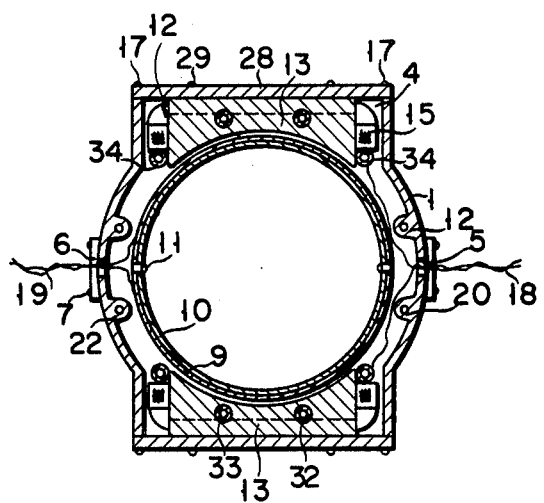

FIG. 16 shows an electromagnetic flowmeter according to a still further modification of the fifth embodiment. The flowmeter in the modification is substantially the same as that in the fifth embodiment except that a pair of nonmagnetic pipes 34 for fastening bolts are formed at both sides of each iron core 13 and are fixed on the end plates 30 and 31. This flowmeter is connected to large-diameter pipes.

According to the electromagnetic flowmeters of the modifications in FIGS. 13 to 16, the same effects as in the fifth embodiment can be obtained. Further, the flowmeters can be selected in accordance with the diameter of the pipes to which the flowmeter is connected and in accordance with the pressure of the fluid.

Figure 17A:
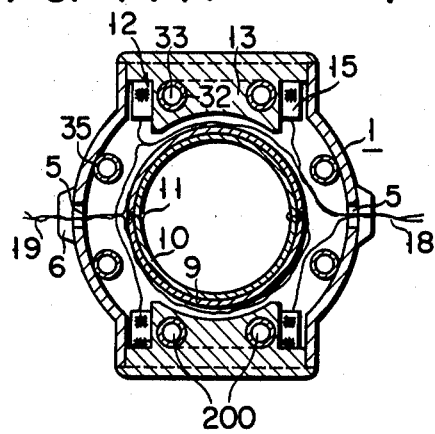
FIGS. 17A and 17B are a cross-sectional view and a partially broken side view, respectively, of an electromagnetic flowmeter according to another modification of the fifth embodiment of the present invention.
Figure 17B:
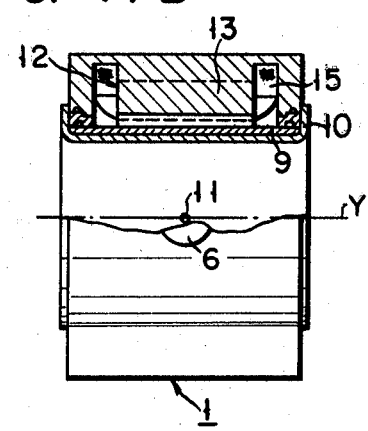

FIGS. 17A and 17B show an electromagnetic flowmeter according to a modification of the fifth embodiment. The flowmeter in the modification is substantially the same as that in the fifth embodiment except that the shoulders 20 are replaced with nonmagnetic pipes 35 with ferromagnetic fastening bolt 200 inserted therein. The manufacturing cost of this flowmeter is lower than that of the fifth embodiment.

Figure 18:
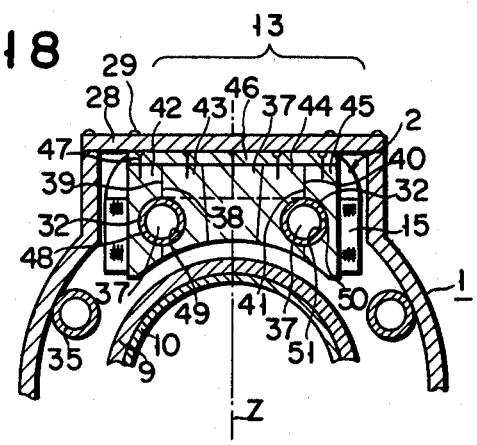
FIGS. 18 and 19 are cross-sectional views of main parts of electromagnetic flowmeters according to sixth and seventh embodiments of the present invention, respectively.

FIG. 18 is an electromagnetic flowmeter according to a sixth embodiment in which an iron core 13 is divided into five segments. The iron core 13 has a central portion 36, the cross section of which is trapezoidal and which has a narrow width near a measuring tube 9; side portions 42, 43, 44 and 45 having divided surfaces 38, 39, 40 and 41 which are parallel to the Z-axis and which include axes of pipes 32 for the fastening bolts; and a ferromagnetic connecting plate 46, the inner surface of which contacts the outer ends of the side portions 42, 43, 44 and 45 and which fixes them with screws 47. The iron core 13 is fixed onto a cover 28 by screws 29 at the outer surface of the connecting plate 46. The end side portions 42, 43, 44 and 45 have grooves 48, 49, 50 and 51 for receiving the pipes 32, respectively. In the sixth embodiment, a magnetic flux generator 12 can be removed from the main casing 1 without removing the pipes 32, after the cover 28 and the connecting plate 46 are first removed and the inner side portions 43 and 44 are then removed and finally the outer side portions 42 and 45 are removed. The generator 12 can be mounted in the main casing 1 in the reverse order from that described above.

Figure 19:
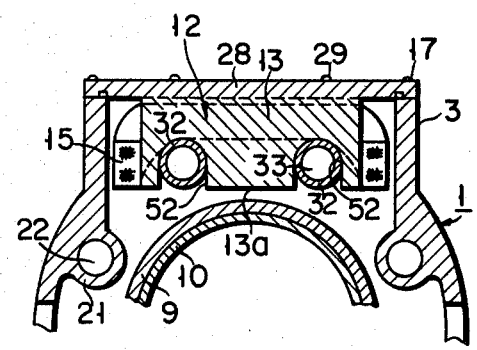

FIG. 19 shows an electromagnetic flowmeter according to an seventh embodiment of the present invention. U-shaped grooves 52 for rebeiving the pipes 32 at the inner end face of the iron core 13 are formed in the iron core 13. In the seventh embodiment, the magnetic flux generator 12 is detachable from the main casing 1 without removing the pipes 32 from the main casing 1 and without dividing the iron core 13 into segments.

Figure 20:
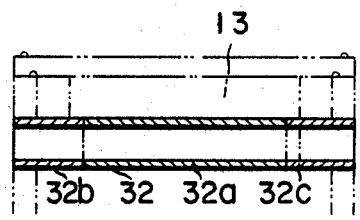
FIG. 20 is a longitudinal sectional view of a pipe for mounting a fastening bolt used in the present invention.

The pipes 32 used in the flowmeter of the seventh embodiment are made of the nonmagnetic material. However, as shown in FIG. 20, if a central portion 32a of the pipe 32 is made of the ferromagnetic material and if end portions 32b and 32c are made of the nonmagnetic material, weakening of the magnetic flux due to formation of the grooves 52 can be compensated for.

Figure 21:
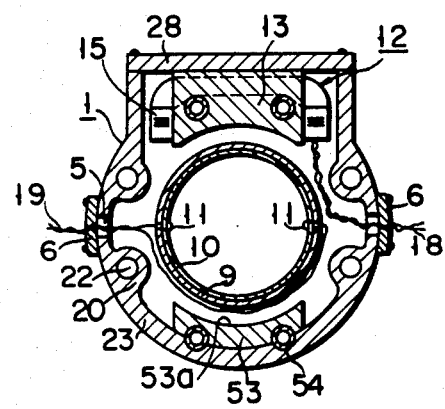

FIG. 21 shows an electromagnetic flowmeter according to a eighth embodiment of the present invention. This flowmeter is substantially the same as that of the sixth embodiment except that one of the pair of magnetic flux generators 12 is replaced with a ferromagnetic yoke 53 which has an inner face 53a concentrical with a measuring pipe 9. Pipes 54 which have the same structure as the pipes 32 for the same purpose are disposed between the yoke 53 and the main casing 1 and are fixed on the end plates at each end of the outer shell 23. The effect obtained by pipes 32 and 54 in the flowmeter according to the eighth embodiment is the same effect as in the fourth embodiment in FIG. 11.

FIG. 22 shows an electromagnetic flowmeter according to a ninth embodiment of the present invention. The flowmeter of this type is suitably used for large-diameter pipes. Generally, electromagnetic flowmeters with iron cores tend to give no results for large-diameter pipes. In the ninth embodiment, the iron core is not used. Instead, a pair of excitation coils 15 are disposed diametrically opposite each other on the inner surface of the outer shell 23 of the main casing 1. Nonmagnetic pipes 55 for receiving the fastening bolts extend axially of the outer shell 23 and arranged circumferentially thereof between the excitation coils 15 and the measuring pipe 9, and are fixed to the end plates of the outer shell 23. The flowmeter according to this embodiment has the same effects as that of the fifth embodiment shown in FIGS. 12A and 12B. Further, the flowmeter according to the ninth embodiment has an advantage in that the distance between the end faces of the flowmeter can be significantly shortened.

In a tenth embodiment of FIG. 23, pipes 32 are fitted into grooves 56 formed at both sides of iron cores 13. The main housing 1 has a box shape. Bosses 3 for forming holes 4 for holding magnetic flux generators are formed perpendicularly to the axis of the measuring tube 9 and the axis of the electrodes 11. Some of the fastening bolts 57 for connecting the flowmeter and the flanges of the pipe, except for the fastening bolts 57 which are inserted through the pipes 32, may be used for holding the parts outside the main casing 1, especially the shoulders 201 of the main casing 1.

In an eleventh embodiment of FIG. 24, nonmagnetic pipes 59 for the fastening bolts are arranged concentrically with a measuring pipe 9 in a space between the measuring tube 9 and an outer shell 23 of a main casing 1 and between the measuring tube 9 and a magnetic flux generator 12.

FIGS. 25A to 25F show modifications of iron cores 13 used in the embodiments in FIGS. 12A and 12B, FIGS. 13 to 21, FIG. 23 and FIG. 24. Iron cores 13 shown in FIGS. 25A, 25B, 25C and 25D correspond to those shown in FIGS. 6B, 6C, 6D and 6E, respectively, obtaining the same effects. One or two nonmagnetic pipes 32 for fastening bolts are mounted in each iron core 13. FIG. 25E shows an iron core 13 wherein the pipes 32 are completely fitted into the grooves 56, while FIG. 25F shows an iron core wherein the pipes 32 are half fitted into the grooves 56. The iron cores 13 in FIGS. 25E and 27F have the same effects as those in FIGS. 25A to 25D.

Figure 26A:
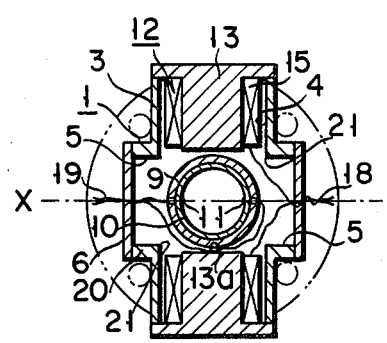
FIGS. 26A and 26B are a cross-sectional view and a partially broken side view, respectively, of an electromagnetic flowmeter according to a twelfth embodiment of the present invention.
Figure 26B:
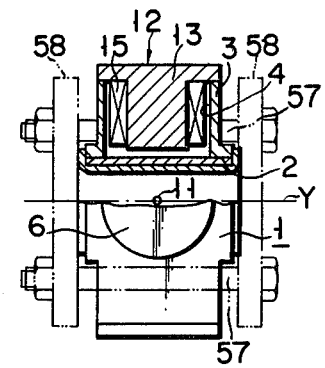

FIGS. 26A and 26B show an electromagnetic flowmeter according to a twelfth embodiment. The flowmeter comprises a box-shaped main housing 1 which defines holes 5 for holding electrodes 5 and bosses 3 which have holes 4 for mounting magnetic flux generators 12. The holes 4 extend perpendicularly to the X- and Y-axes of the holes 5 and a measuring tube 9. Outer ends of the iron cores 13 are flanged and act as covers of the holes 4 and ferromagnetic plates. A distance between the X-axis and inner surfaces 13a of the iron cores 13 is equal or greater than a distance between the X-axis and the edges 21 of shoulders 20 which are defined by the holes 4 and 5. The width of the iron core 13 is not larger than the outer diameter of the measuring tube 9. Therefore, the flowmeter according to the twelfth embodiment has the same effects as that according to the first embodiment. Flange fastening bolts 57 which are inserted into flanges 58 of the pipe to which the flowmeter is connected contact outer surfaces of the shoulders 20 defined by the holes 5 and the bosses 3 whereby the fastening bolts 57 hold the flowmeter. Therefore, the bolts 57 are not inserted through the flowmeter and are mounted on or dismounted from the flanges 58 to mount the flowmeter on or dismount it from the pipes.

Figure 27A:
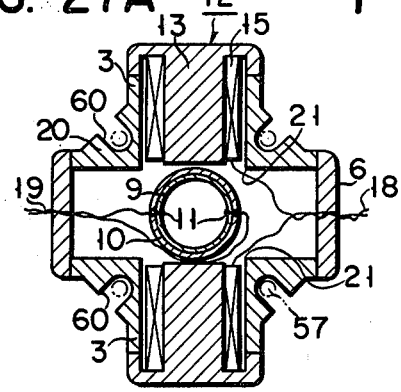
FIGS. 27A and 27B are a cross-sectional view and a partially broken side view, respectively, of an electromagnetic flowmeter according to one modification of the twelfth embodiment of the present invention.
Figure 27B:
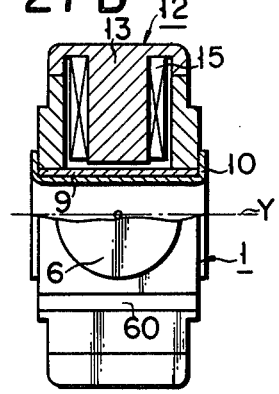

FIGS. 27A and 27B show an electromagnetic flowmeter according to one modification of the twelfth embodiment. The flowmeter of this modification is substantially the same as that of the twelfth embodiment except that engaging grooves 60 are formed in the shoulders 20 to receive the fastening bolts 57 and to firmly hold the bolts 57.

In the twelfth embodiment and its modification, the shape of the iron cores 13 may be changed as shown in FIGS. 7A and 7B.

Figure 28A:
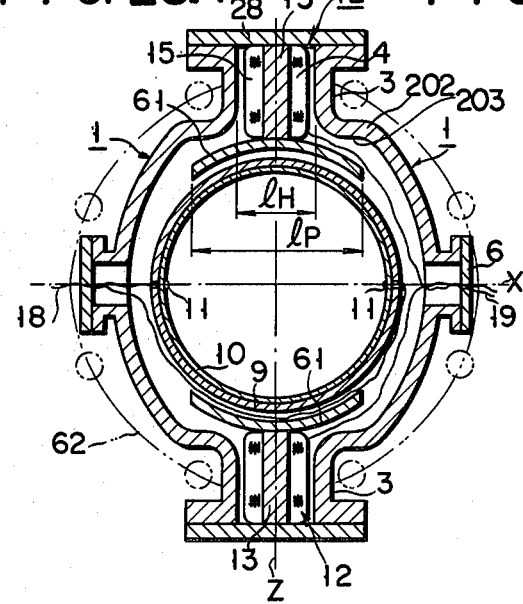
FIGS. 28A and 28B are a cross-sectional view and a partially broken side view, respectively, of an electromagnetic flowmeter according to a thirteenth embodiment of the present invention.
Figure 28B:
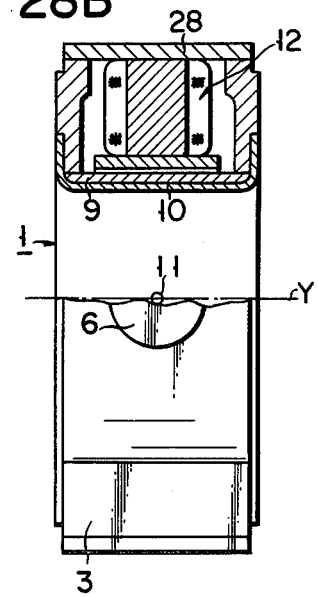

FIGS. 28A and 28B show an electromagnetic flowmeter according to a thirteenth embodiment. Magnetic flux generators 12 which are excited by a square wave, triangular wave or DC current and which generate a magnetic flux, the first or second differential of which is zero, are mounted in bosses 30. The generators 12 are fixed in a main casing 1 and are covered with ferromagnetic covers 28. The magnetic flux of the central part of the generators 12 is perpendicular to the X-axis of a pair of electrodes 11 and the Y-axis of a measuring tube 9 and is applied to the fluid in the measuring tube 9.

The portion 202 of the main casing 1 which is adjacent to the inner end of each boss 3 has a substantially flat inner surface 203. The surface 203 is disposed at substantially the same level as that of the inner end face of the respective iron core 13 of the magnetic flux generator 12, whereby the portion 202 acts as magnetic flux induction means like the shoulder 20 of, for example, the first embodiment.

Each of pole plates 61 extends from the inner end face of the respective iron core 13 in the opposite circumferential directions of the measuring tube 9 at an equal distance. A width of the pole plate 61, that is, a chord length lp, is greater than a hole diameter lH of holes 4 for mounting magnetic flux generators 12 in the bosses 3. Further, the main casing 1 is disposed in an imaginary circle 62 defined by the fastening bolts around the main casing 1 whereby the flowmeter can be easily mounted on or dismounted from the flanges of the pipe.

The following effects can be obtained by the embodiment described above:

(1) Since the magnetic flux generators for generating magnetic fluxes whose first or second differential is zero, an alternate current effect which adversely affects the flow measurement is substantially eliminated even if the magnetic flux passes through the main casing 1. Laminated core which contacts the inner face of the main casing need not be used for reducing noise. As a result, the main casing 1 can be small in size and has a thin wall. Further, since the main casing 1 is covered with the ferromagnetic material except for the ends of the measuring tube, the distance between the end faces of the measuring tube may be reduced, so that the light weight electromagnetic flowmeter can be obtained.

(2) Since the coil is excited by a square wave excitation current to generate the magnetic flux as in item (1), commercial power source noises and any other noises can be easily eliminated. Even if a magnetic flux density is 1/5 to 1/10 that of the alternate current excitation, measurement with a high S/N ratio can be performed. When the pipes to which the electromagnetic flowmeter is connected are large, many fastening bolts must be used. Thus, the flanges of the pipes are formed with many holes for receiving the fastening bolts with the result that the space between adjacent holes is very small. The conventional large magnetic flux generator cannot be set in the space. The magnetic flux generator of the present invention, however, is small enough to be disposed in the small space. In other words, the electromagnetic flowmeter of the present invention can be used with pipes having a large diameter of, for example, more than 100 mm.

(3) Since the measurement with a high S/N ratio can be performed even if the magnetic flux density is small as described in item (2), the necessary magnetic flux for measurement can be obtained even if the size of pole plate is increased. Further, utilizing the advantage that flowing of the magnetic flux into the main casing does not result in an error of measurement as described in item (1), the chord length lp of the pole plate 61 which is perpendicular to the axis of the measuring tube is increased and the leakage of the magnetic flux between the main casing 1 and the respective surface of the pole plate 61 which faces the main casing 1 is utilized, whereby an error of the flow speed measurement due to the flow speed variation of the fluid can be minimized.

FIGS. 29 to 32 show electromagnetic flowmeters according to modifications of the thirteenth embodiment.

Figure 29:
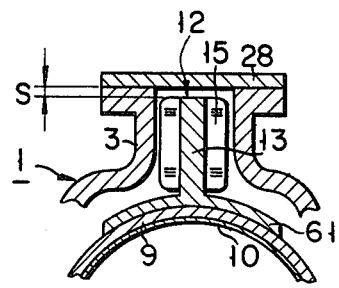
FIGS. 29 to 32 are cross-sectional views of main parts of the electromagnetic flowmeters according to modifications of the thirteenth embodiment, respectively.
Figure 30:
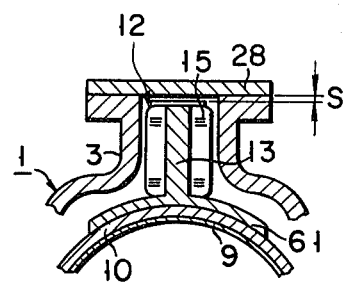
Figure 31:
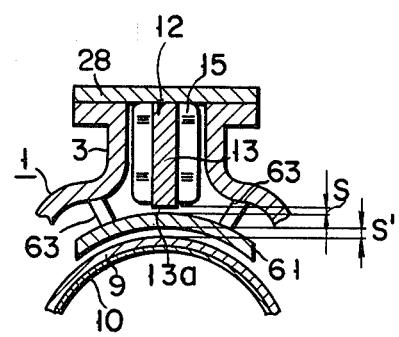
Figure 32:
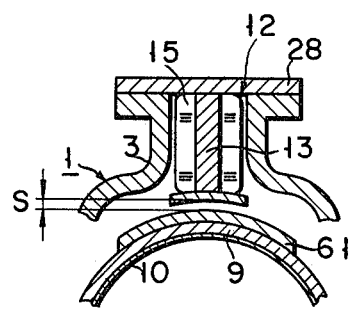

In the modification of FIGS. 29 and 30, a magnetic gap S is formed between the outer end face of the iron core 13 and the inner face of the cover 28 which also acts as the ferromagnetic plate. Further, the inner face of the pole plate 61 contacts the outer surface of the measuring tube 9. In the modification of FIG. 31, supports 63 are fixed on the inner wall of the main casing 1 whereby a gap S' is formed between the outer surface of the measuring tube 9 and the inner face of the pole plate 61 and the gap S is also formed between the outer face of the pole plate 61 and the inner end face of the iron core 13. In the modification of FIG. 32, the inner end face of the pole plate 61 contacts the outer surface of the measuring tube 9. The inner end face of the iron core 13 is spaced apart from the outer face of the pole plate 61 by the gap S. The electromagnetic flowmeters of those modifications can obtain the same effects as that of the thirteenth embodiment.

Figure 33A:
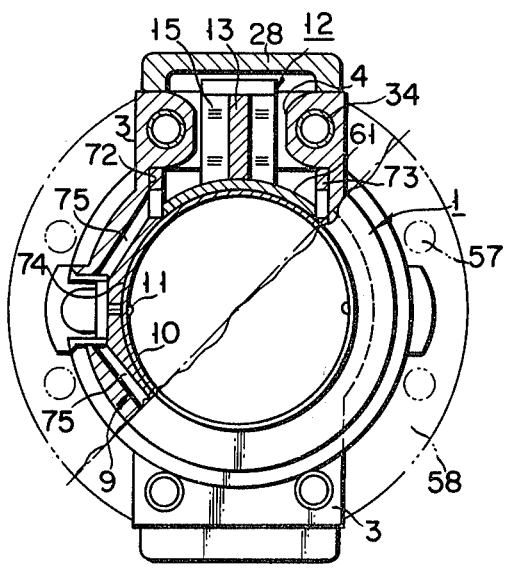
FIGS. 33A and 33B, FIGS. 34A and 34B, and FIGS. 35A and 35B respectively show electromagnetic flowmeters according to the fourteenth, fifteenth and sixteenth embodimtns of the present invention, in which the figures indicated by A are cross-sectional views, while the figures indicated by B are side views.
Figure 33B:
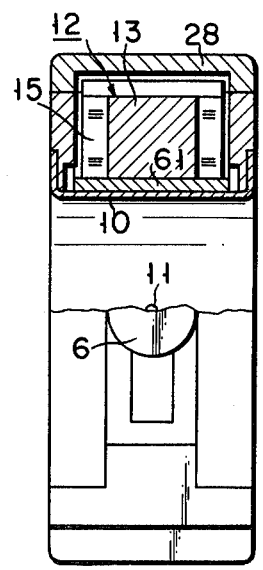

FIGS. 33A and 33B show an electromagnetic flowmeter according to a fourteenth embodiment of the present invention wherein the inner diameter of a main casing 1 has the same diameter as the flowmeter. Holes 72 whose diameter is larger than that of holes 4 for mounting magnetic flux generators 12 are formed on inner end walls of bosses 3 and are coaxial with the excitation coils 12. Ring-shaped nonmagnetic insulators 73 whose inner diameter is the same as the outer diameter of pole plates 61 are fitted in the holes 72, whereby the magnetic plates 61 are magnetically insulated from other parts in the main casing 1. A measuring tube 9 is constituted by a cylindrical solid portion 74 of the main casing 1 and the pole plates 61. A lining 10 is formed on the inner face of the measuring tube 9. Passages 75 for the lead wires of coils 15 are formed in the cylindrical solid portions 74 of the main casing 1 and the nonmagnetic insulators 73. Two nonmagnetic pipes 32 for inserting the fastening bolts extend through the solid portion 74 of each boss 3.

Figure 34A:
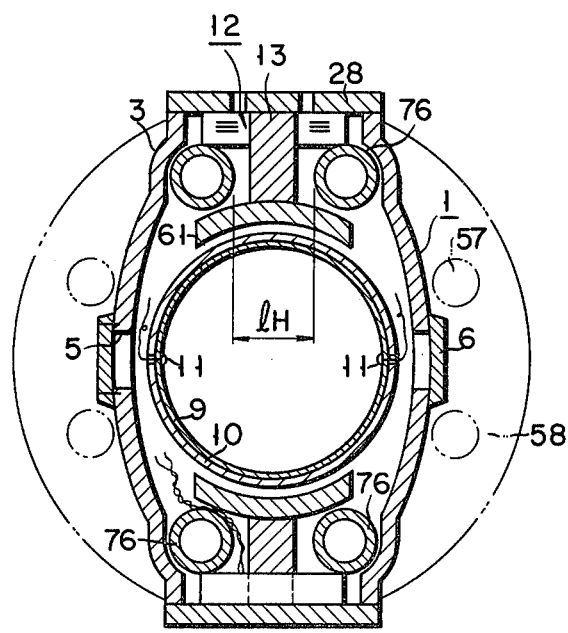
Figure 34B:
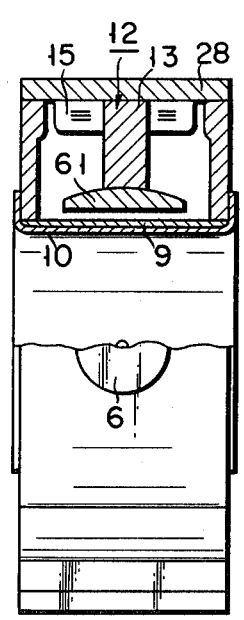

FIGS. 34A and 34B show an electromagnetic flowmeter according to a fifteenth embodiment of the present invention. A main casing 1 has a thin wall. Coils 15 of magnetic flux generator 12 are wound at the outer end portions of iron cores 13. Nohmagnetic pipes 76 for the fastening bolts extend between both sides of each iron core 13 and between the coils 15 and pole plates 61. The main casing 1 is of a substantially elliptical shape. This flowmeter can be used especially when intervals between the adjacent fastening bolts are small.

Figure 35A:
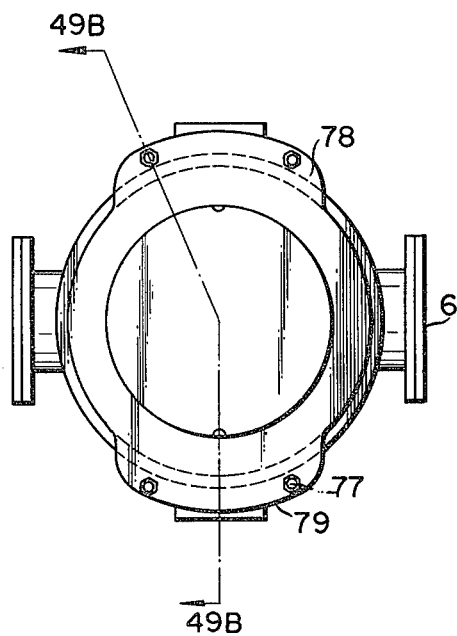
Figure 35B:
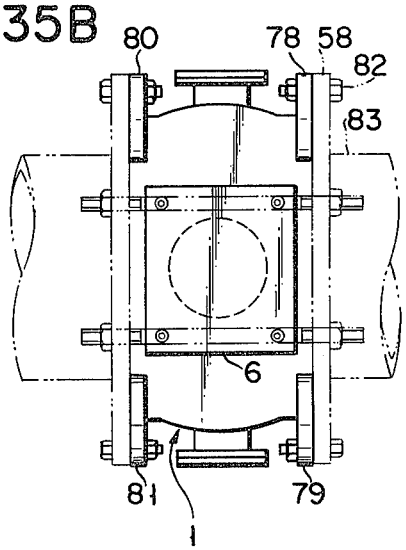

FIGS. 35A and 35B show an electromagnetic flowmeter according to a sixteenth embodiment. Lugs 78 and 79, and lugs 80 and 81 are formed at both ends of a main casing 1. Each of the lugs 78, 79, 80 or 81 has two bores 77 for the fastening bolts. Short fastening bolts 82 are used to mount the flowmeter on the flanges 78 and 79 which are connected to flanges 58 at one end of the pipe. The flowmeter is thus temporarily held on pipes 83. Thereafter, the flowmeter is connected completely to the pipes 83 by using the fastening bolts 57. The mounting operation is thus simplified and performed safely. The lugs may be formed at one of the ends of the main casing 1.

FIGS. 36A to 41 show the fastening bolt arrangement for mounting the electromagnetic flowmeter on the flanges of the pipe.

Figure 36A:
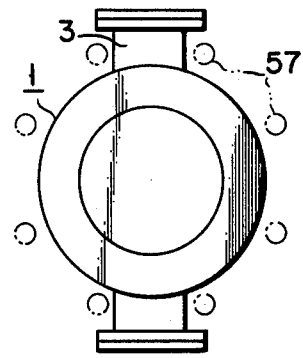
FIGS. 36A and 36B, and FIGS. 37A and 37B respectively show electromagnetic flowmeters according to seventeenth and eighteenth embodiments of the present invention, in which the figures indicated by A are front views, while the figures indicated by B are side views.
Figure 36B:
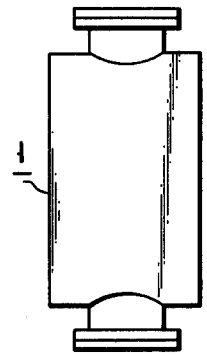

In a seventeenth embodiment of FIGS. 36A and 36B, fastening bolts 57 are arranged to surround the outer surface of the main casing 1. The arrangement is substantially the same as that in the twelfth, and thirteenth embodiments.

Figure 37A:
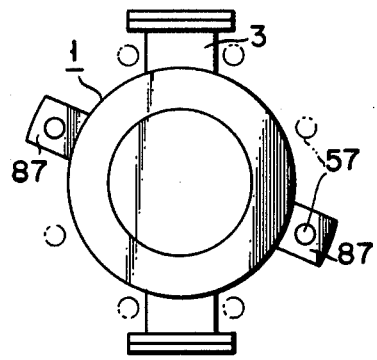
Figure 37B:
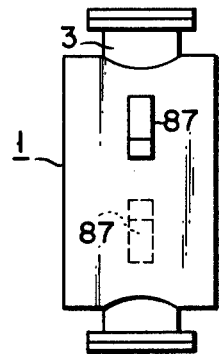

In an eighteenth embodiment of FIGS. 37A and 37B, two bolts among the fastening bolts 57 of the seventeenth embodiment extend through metal pieces 87 which radially extend from the center portion of the lateral side surfaces of the main casing 1.

Figure 38:
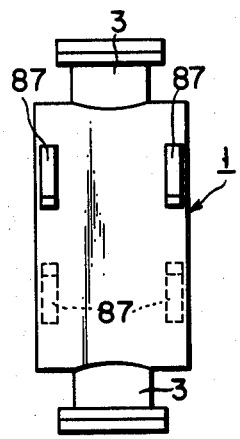
FIG. 38 is a side view of an electromagnetic flowmeter according to the nineteenth embodiment of the present invention.

A nineteenth embodiment of FIG. 38 has one pair of metal pieces 87 (shown in the eighteenth embodiment) at each end of the main casing 1 so that the flowmeter is securely connected to the pipes.

Figure 39A:
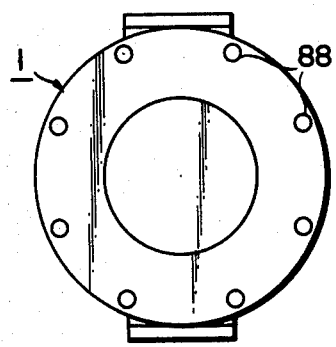
FIGS. 39A and 39B, and FIGS. 40A and 40B respectively show electromagnetic flowmeters according to the twentieth and twenty-first embodiment of the present invention, in which the figures indicated by A are front views and the figures indicated by B are side views.
Figure 39B:
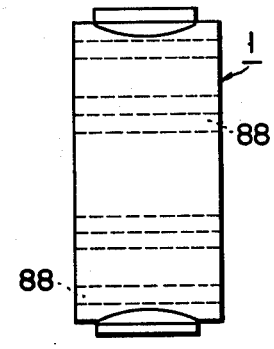

In a twentieth embodiment of FIGS. 39A and 39B, bores 88 for the fastening bolts are formed in the main casing 1. The bores 88 pass through the outer peripheral portion of the main casing 1. The use of fastening bolts in this embodiment is substantially the same as that in the first to fifth embodiments, the modification of the fifth embodiment and the sixth to ninth embodiments.

Figure 40A:
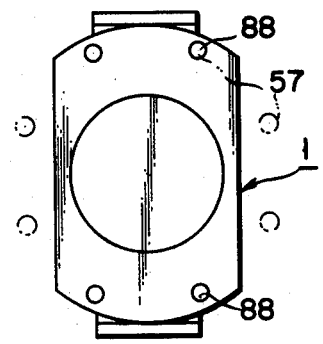
Figure 40B:
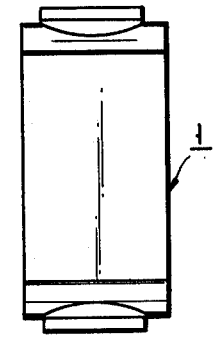

In a twentieth embodiment of FIGS. 40A and 40B, some of the fastening bolts 57 extend through the main casing 1. For this purpose, through holes 88 are formed in the main casing 1. The use of fastening bolts in this embodiment is substantially the same as that in the fifteenth embodiment.

Figure 41:
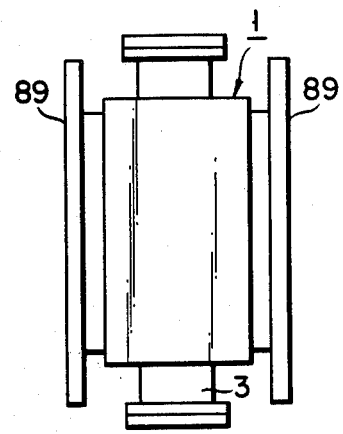
FIG. 41 is a side view of electromagnetic flowmeters according to the twenty-second embodiment of the present invention.

In a twenty-first embodiment of FIG. 41, a pair of flanges 89 which have bores for fastening bolts are formed at the both ends of the main casing 1.

What is claimed is:

1. An electromagnetic flowmeter comprising:
   a ferromagnetic main casing;
   a nonmagnetic flow speed measuring tube passing through said main casing;
   a pair of electrodes exposedly and diametrically disposed in said flow speed measuring tube and electrically insulated therefrom;
   a magnetic flux generator comprising an iron core and coil means surrounding said iron core, said iron core being disposed perpendicularly to said flow speed measuring tube and to a line connecting the centers of said pair of electrodes, said iron core having a width smaller than the inner diameter of said flow speed measuring tube and also having an inner end face disposed adjacent to said flow speed measuring tube; and
   magnetic flux induction means comprising shoulders formed in a vicinity of said inner end face of said iron core in said main casing for reducing and extending a magnetic flux density at least in a vicinity of said pair of electrodes.

2. The flowmeter according to claim 1, wherein each of said shoulders comprises part of said ferromagnetic main casing.

3. The flowmeter according to claim 2, wherein said main casing comprises a solid member having a bore for receiving said flow speed measuring tube, a first hole for receiving said magnetic flux generator, and a second hole for holding one of said pair of electrodes, said shoulders being formed in said solid member of said main casing.

4. The flowmeter according to claim 3, wherein said shoulders are defined by said first and second holes and have edges defined by said first and second holes.

5. The flowmeter according to claim 4, wherein said edges are positioned closer to the line connecting the centers of said pair of electrodes than said inner end face of said iron core.

6. The flowmeter according to claim 1, wherein said shoulder has a tubular form and is disposed parallel to said flow speed measuring tube.

7. The flowmeter according to claim 1, wherein said main casing comprises a thin outer shell, and said shoulders comprise a nonmagnetic cylinder extending parallel to said flow speed measuring tube with ferromagnetic tightening bolts inserted thereinto.

8. The flowmeter according to claim 7, wherein said cylinder is a pipe for receiving said fastening bolt.

9. The flowmeter according to claim 1, wherein the inner end face of said iron core is flat.

10. The flowmeter according to claim 9, wherein the inner end face of said iron core is larger than any other parts thereof.

11. The flowmeter according to claim 1, wherein the inner end face of said iron core is concave.

12. The flowmeter according to claim 1, wherein the inner end face of said iron core has two recesses extending along said flow speed measuring tube.

13. The flowmeter according to claim 1, wherein the inner end face of said iron core comprises a convex surface and a concave surface at a center thereof.

14. The flowmeter according to claim 1, further comprising at least one nonmagnetic pipe for receiving the fastening bolt, said pipe being disposed parallel to said flow speed measuring tube and extending through said iron core.

15. The flowmeter according to claim 14, wherein said iron core is dividable by at least a plane which passes through a central axis of said pipe and which is perpendicular to said flow speed measuring tube and the line connecting the centers of said pair of electrodes.

16. The flowmeter according to claim 14, wherein a U-shaped groove is formed on the inner end face of said iron core to receive said pipe.

17. The flowmeter according to claim 14, wherein a groove is formed on a side surface of said iron core to receive said pipe.

18. The flowmeter according to claim 1, wherein a pole plate having a width larger than a width of said iron core is disposed on the inner end face of said iron core.

19. The flowmeter according to claim 18, wherein a central portion of said pole plate is fixed to the inner end face of said iron core.

20. The flowmeter according to claim 19, wherein said pole plate has an arcuated cross section concentrical with a cross section of said flow speed measuring tube.

21. The flowmeter according to claim 20, wherein said pole plate is spaced apart from said flow speed measuring tube.

22. The flowmeter according to claim 20, wherein said pole plate contacts said flow speed measuring tube.

23. The flowmeter according to claim 18, wherein said pole plate is spaced apart from said iron core.

24. The flowmeter according to claim 23, wherein said pole plate is spaced apart from said flow speed measuring tube.

25. The flowmeter according to claim 23, wherein said pole plate contacts said flow speed measuring tube.

26. The flowmeter according to claim 18, wherein said pole plate and an inner wall of said main casing constitute said flow speed measuring tube.

27. The flowmeter according to claim 18, wherein said main casing has a cover which covers said magnetic flux generator and which acts as a ferromagnetic plate.

28. The flowmeter according to claim 27, wherein said iron core is spaced apart from said cover.

29. The flowmeter according to claim 1, wherein said coil means is a coil which is uniformly wound around said iron core.

30. The flowmeter according to claim 1, wherein said coil means comprises a coil which is nonuniformly wound around said iron core.

31. The flowmeter according to claim 1, wherein said coil means comprises a coil wound around an outer end portion of said iron core.

32. The flowmeter according to claim 1, wherein said coil means comprises a coil which wound thick around an outer end portion of said iron core and thin around an inner end portion thereof.

33. The flowmeter according to claim 1, further comprising a yoke radially opposing said magnetic flux generator in said main casing.

34. The flowmeter according to claim 33, wherein said yoke is integral with said main casing.

35. The flowmeter according to claim 33, wherein said yoke is formed separately from said main casing and is fixed thereto.

36. The flowmeter according to claim 1, further comprising at least another magnetic flux generator disposed in said main casing.

37. The flowmeter according to claim 36, wherein said another magnetic flux generator opposes said magnetic flux generating means.

38. The flowmeter according to claim 36, wherein said magnetic flux induction means is disposed between said magnetic flux generator and said another magnetic flux generator.

39. The flowmeter according to claim 1, wherein said main casing has shoulders formed on an outer surface thereof for receiving said fastening bolts.

40. The flowmeter according to claim 39, wherein said main casing has grooves for receiving said fastening bolts in said shoulders.

41. The flowmeter according to claim 1, further comprising lugs which is fixed to an outer surface of said main casing and into which said fastening bolts are inserted.

42. The flowmeter according to claim 1, further comprising projections mounted on an outer surface of said main casing for receiving said fastening bolts.

43. The flow meter according to claim 1, wherein said magnetic flux generator generates a magnetic flux whose first and second differentials are zero.

44. The flowmeter according to claim 1, wherein said flow speed measuring tube comprises a filler filled in said main casing with said bore formed therein.

45. An electromagnetic flowmeter comprising:
a ferromagnetic main casing;
a nonmagnetic flow speed measuring tube passing through said main casing;
a pair of electrodes exposedly and diametrically disposed in said flow speed measuring tube and electrically insulated therefrom;
a magnetic flux generator comprising an iron core and coil means surrounding said iron core, said iron core being disposed perpendicularly to said flow speed measuring tube and to a line connecting the centers of said pair of electrodes, said iron core having an inner end face disposed adjacent to said flow speed measuring tube; and
magnetic flux induction means comprising shoulders formed in a vicinity of said inner end face of said iron core in said main casing for reducing and extending a magnetic flux density at least in a vicinity of said pair of electrodes.

46. The flowmeter according to claim 45, wherein each of said shoulders comprises part of said ferromagnetic main casing.

47. The flowmeter according to claim 46, wherein said main casing comprises a solid member having a bore for receiving said flow speed measuring tube, a first hole for receiving said magnetic flux generator, and a second hole for holding one of said pair of electrodes, said shoulders being formed in said solid member of said main casing.

48. The flowmeter according to claim 47, wherein said shoulders are defined by said first and second holes and have edges defined by said first and second holes.

49. The flowmeter according to claim 48, wherein said edges are positioned closer to the line connecting the centers of said pair of electrodes than said inner end face of said iron core.

50. The flowmeter according to claim 45, wherein the inner end face of said iron core is flat.

51. The flowmeter according to claim 45, wherein said coil means is a coil which is uniformly wound around said iron core.

52. The flow meter according to claim 45, further comprising at least another magnetic flux generator disposed in said main casing.

53. The flowmeter according to claim 46, wherein said another magnetic flux generating means opposes said magnetic flux generator.

54. The flowmeter according to claim 53, wherein said magnetic flux induction means is disposed between said magnetic flux generator and said another magnetic flux generator.

55. The flowmeter according to claim 45, wherein said magnetic flux generator generates a magnetic flux whose first and second differentials are zero.

* * * * *